Dec. 18, 1928.

1,695,885

L. N. CRICHTON

PROTECTIVE SYSTEM

Filed March 18, 1925

WITNESSES:

INVENTOR
Leslie N. Crichton
BY
ATTORNEY

Patented Dec. 18, 1928.

1,695,885

UNITED STATES PATENT OFFICE.

LESLIE N. CRICHTON, OF PITTSBURGH, PENNSYLVANIA, ASSIGNOR TO WESTINGHOUSE ELECTRIC & MANUFACTURING COMPANY, A CORPORATION OF PENNSYLVANIA.

PROTECTIVE SYSTEM.

Application filed March 18, 1925. Serial No. 16,397.

My invention relates to protective systems and particularly to protective systems embodying a direct-trip circuit interrupter that has an inverse time-element characteristic up to a predetermined value of overload.

One object of my invention is to provide a circuit-interrupter that shall have a trip coil with means for energizing the trip coil directly from the circuit and a high resistance shunt circuit for preventing effective energization of the trip coil under certain conditions.

Another object of my invention is to provide a circuit-interrupter that shall have a trip coil and a time-element relay for controlling a high resistance shunt circuit to delay the energization of the trip coil under normal conditions, the impedance of the shunt circuit having such value that the trip coil is instantaneously energized upon excessive overloads.

In accordance with my invention, a circuit-interrupter having a trip coil is provided in the circuit of a motor or similar apparatus, the trip coil being directly energized from the circuit. A high resistance shunt circuit controlled by a relay having an inverse time-element characteristic normally prevents operative energization of the trip coil except for sustained overloads, but the impedance of the shunt circuit has such value that for excessive overloads, the trip coil is energized instantaneously. The inverse time-element characteristic of the relay provides ample protection of the connected apparatus against overloads but in the case of a short-circuit in the apparatus or in the connecting circuit, it is desirable to open the circuit instantaneously.

Figure 1:
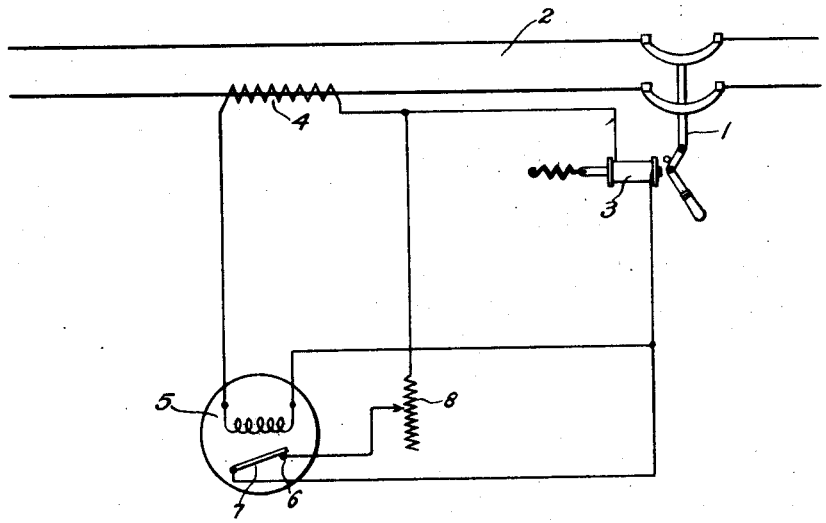
Figure 2:
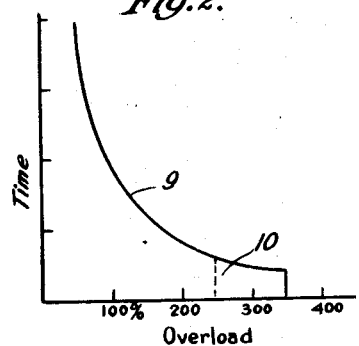

In the accompanying drawings, Figure 1 is a diagrammatic view of a protective system embodying my invention, and Fig. 2 is a curve showing the operating characteristics of the circuit-interrupter shown in Fig. 1.

Referring to Fig. 1, a protective system for an electrical circuit is shown comprising a circuit-interrupter 1 controlling a circuit 2, the circuit-interrupter being provided with a trip coil 3 for opening the same under certain conditions. The trip coil 3 is directly energized from circuit 2, a current transformer 4 having its secondary winding connected to the trip coil being provided for this purpose. A time-element relay 5 is connected in series with the trip coil 3 and the current transformer 4. The relay 5 may be an induction relay similar to that shown in U. S. Patent No. 1,286,239, Copley et al., dated December 3, 1918 and which comprises stationary and movable contact members 6 and 7, normally in engagement. A shunt circuit including the contact members 6 and 7 and a variable resistor 8 is connected across the trip coil 3 and serves to prevent the operative energization of the trip coil 3 under normal conditions.

Upon the occurrence of a short-circuit or sustained overload in the circuit 2, the relay 5 is actuated to disengage the contact members 6 and 7 in a time that is inversely proportional to the current traversing the circuit-interrupter. When the relay 5 is operated, the shunt circuit across the trip coil 3 is opened and the current through the secondary winding of the transformer 4 traverses the trip coil 3, thereby opening the circuit-interrupter 1. In case the overload or short-circuit causes a current to traverse the circuit 2 that is above a predetermined value, sufficient current will traverse the trip coil 3 by reason of the impedance of the shunt circuit including the resistor 8 to trip the circuit-interrupter 1 practically instantaneously which is desired under these conditions.

The operating characteristics of the circuit interrupter are clearly shown in Fig. 2. The curve 9 represents the time required for the circuit-interrupter to operate for different values of overload. For moderate sustained overloads, the operating time of the circuit-interrupter is inversely proportional to the overload. For an overload above a predetermined value, which is approximately 350% for the assumed case, the current through the trip coil 3 is sufficient to trip the circuit-interrupter practically instantaneously though the relay 5 does not operate. By varying the value of the resistor 8, the current at which the circuit-interrupter will trip instantaneously may be changed as desired. If it is desired that the circuit-interrupter shall trip instantaneously upon an overload of approximately 250%, as indicated by the dotted line 10 in Fig. 2, the value of the resistor 8 is decreased.

I do not consider that my invention is limited to the precise form shown and described. In particular, the relay 5 may be any retarded relay having sufficiently constant time-element characteristics, such as a thermal relay. Accordingly, I do not wish my invention to be limited in scope except as indicated in the claim.

I claim as my invention:

The combination with a circuit to be protected and a circuit interrupter therefor provided with a trip coil, of an over-load-responsive relay having normally closed contacts, a shunt circuit for said trip coil comprising said contacts and an impedance device in series-circuit relation, said impedance device being so proportioned that, upon the occurrence of an abnormal overload upon said circuit, said trip coil is operatively energized irrespective of the operation of said relay.

In testimony whereof, I have hereunto subscribed my name this 9th day of March, 1925.

LESLIE N. CRICHTON.